April 9, 1940.　　　E. A. VANETTA　　　2,196,819
PROPELLER
Filed Oct. 22, 1938　　　2 Sheets-Sheet 1
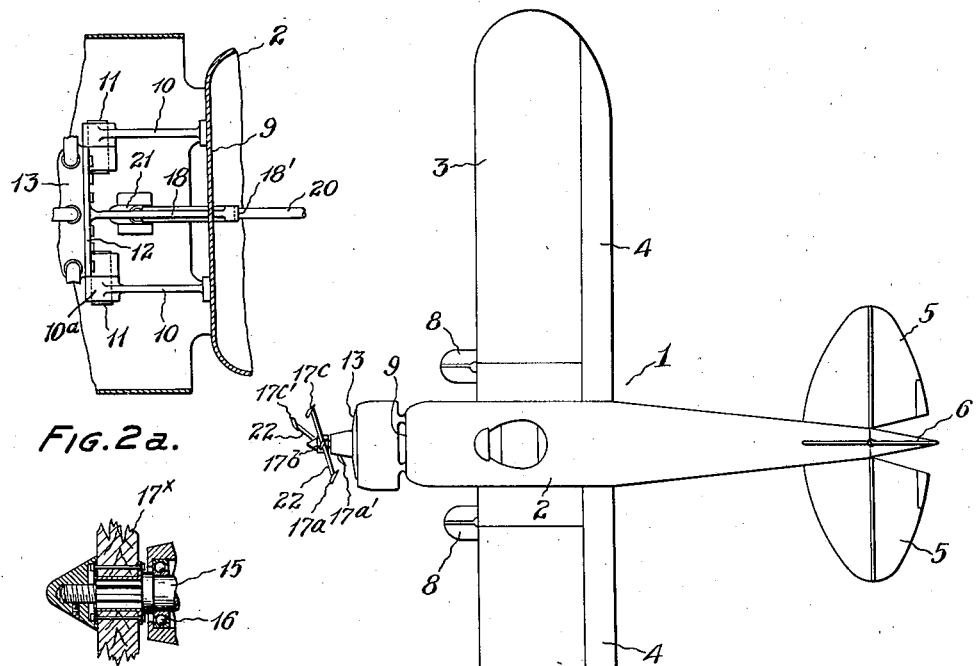
FIG. 2a.
FIG. 3.
FIG. 1.
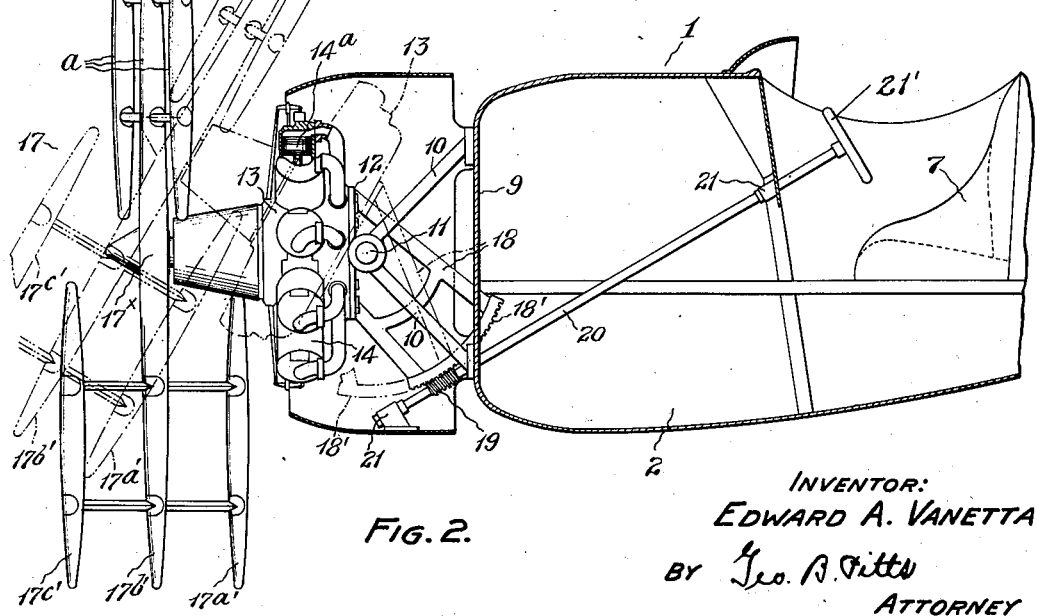
FIG. 2.
INVENTOR:
EDWARD A. VANETTA
BY　　　　
ATTORNEY

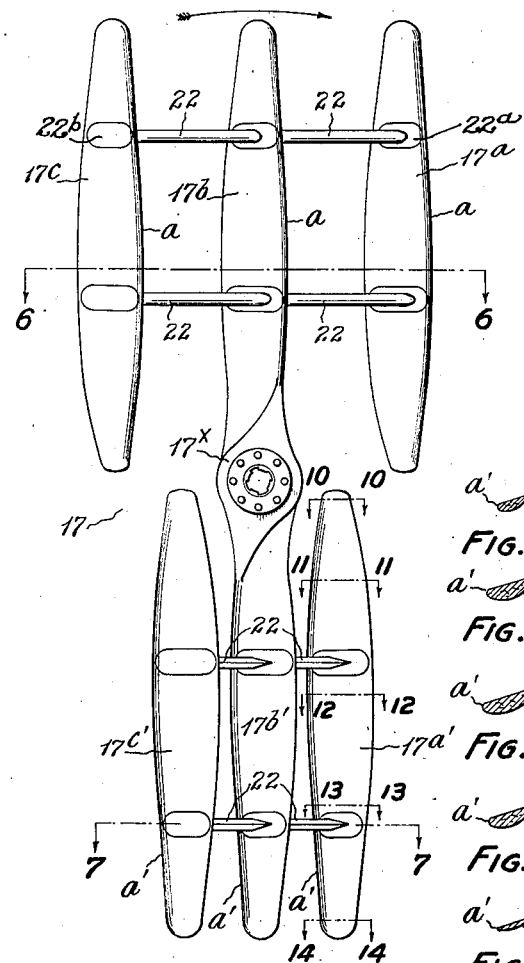
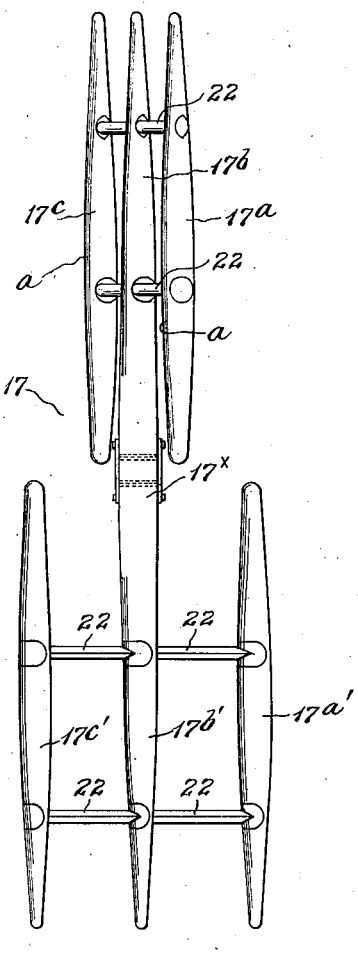
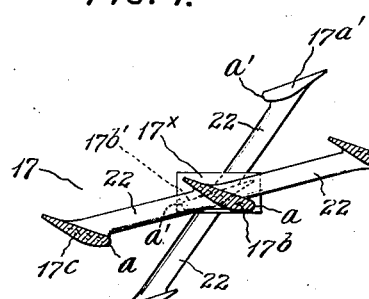
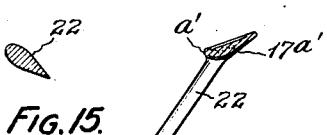
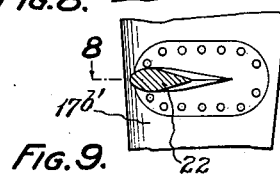

Patented Apr. 9, 1940

2,196,819

UNITED STATES PATENT OFFICE 2,196,819

PROPELLER

Edward A. Vanetta, Euclid, Ohio

Application October 22, 1938, Serial No. 236,443

3 Claims. (Cl. 170—165)

This invention relates to an airplane adapted for various uses, more particularly to the propelling means for a plane. The form of construction shown consists of a monoplane, but such form is merely for illustrative purposes since the invention may be applied to other types of multi-winged airplanes.

In all airplanes of which I have knowledge contact with the ground or other surface in completing a landing takes place while the airplane is moving at a high speed dependent upon its initial speed, as well as its size and weight. Because of the high speed involved, a large area or runway is required to bring the airplane to a safe stop. It is desirable for the airplane to make ground contact at as low a speed as possible, which not only facilitates the operation of landing and reduces the danger of accidents, but permits the landing to be made in a small area. By reducing the required area for landing operations, airport capacity is increased and landing on decks of airplane carriers or other vessels is facilitated. Also, in all airplanes of which I have knowledge, the blades of the propellers are arranged to revolve in the same plane or path so that each creates and maintains a disturbance in the air and prevents the succeeding blade from effecting a maximum propeller thrust on the airplane; in other words, there is a loss of energy, termed slip, between the theoretical thrust effect of the propeller based upon the pitch of its blades and their speed of revolution and the actual thrust imparted to the airplane to sustain it in flight and at the desired speed.

One object of the invention is to provide for an airplane an improved propelling means comprising a propeller mounted for adjustment, at will, into an angular relation to the direction of flight, whereby the direction of propeller thrust upon the airplane may be changed, the effect of which is (a) to reduce the speed of the plane, so that in making contact with the ground and completing a landing, the danger of shock and accident is materially lessened and the plane may be finally stopped within a relative short distance and (b) to permit take-off in a relatively small area.

Another object of the invention is to provide an improved propeller for an airplane arranged to increase the thrust upon the airplane, without increase in power.

Another object of the invention is to provide an improved propeller for an airplane having blades so related that increased thrust effect results.

Another object of the invention is to provide an improved propeller for an airplane having blades disposed in different planes and connected together so as to reduce vibration of the blades, whereby smoother operation of the propeller results and strains on the bearings for the propeller shaft are reduced.

Other objects of the invention will be apparent to those skilled in the art to which my invention relates from the following description taken in connection with the accompanying drawings, wherein Fig. 1 is a plan view of an airplane embodying my invention.

Fig. 2 is a fragmentary view partly in elevation and partly in section.

Fig. 2a is a fragmentary section showing the mounting for the engine in plan.

Fig. 3 is a fragmentary sectional view showing the connection of the propeller to the shaft of the engine.

Fig. 4 is a front elevation of the propeller, enlarged.

Fig. 5 is a side elevation of the propeller.

Figs. 6 and 7 are sections on the lines 6—6 and 7—7, respectively of Fig. 4.

Fig. 8 is a section on the line 8—8 of Fig. 9.

Fig. 9 is a section on the line 9—9 of Fig. 8.

Figs. 10 to 14, inclusive, are sections on the lines 10—10, 11—11, 12—12, 13—13 and 14—14, respectively, of Fig. 4.

Fig. 15 is a section on the line 15—15 of Fig. 8.

In the drawings, 1 indicates as an entirety an airplane comprising a fuselage 2, wings or planes 3 having suitable ailerons 4, elevators 5 and a rudder 6. The fuselage 2 is, by way of example, shown as of the cockpit type having a seat 7. 8 indicates the landing gear. The parts above described and the controls (not shown) therefor may be of any desired construction and are shown substantially diagrammatically as they, as well as the usual fuel and oil tanks and their connections, form no part of the present invention. The airplane structure forming the fuselage 2 and wings 3, includes a wall 9 to which is rigidly secured spaced brackets 10. The brackets 10 are provided at their outer ends with bearings 10a for trunnions 11, which are secured to or formed integral with a base 12. 13 indicates as an entirety an internal combustion engine removably secured to the base 12. The engine 13 may be of any desired type and construction, but preferably consists of a plurality of cylinders 14 disposed radially about a common axis, the pistons 14a therein being drivingly connected to a shaft 13, the outer end portion of which is suitably mounted in anti-friction bearings 16 (see Fig. 3). 17 indicates as an entirety a propeller, to which reference will later be made, detachably connected to the shaft 15. The trunnions 11 permit the engine 13 and propeller 17 to be bodily tilted into any desired position at an angle to the longitudinal axis of the fuselage or the direction in which the plane is flying, as shown in dotted lines in Fig. 2. When adjusted to an angular position, as above set forth, the thrust imparted to the plane by the propeller is reduced, so that in approaching the ground preliminary to landing the speed of the plane is reduced and when the airplane nears the ground the propeller thrust upon the latter serves to further reduce the plane speed, so that less area is required to bring the plane to a final stop. Due to the reduction in speed, danger of shock or accident in making contact with the ground is greatly lessened. Likewise, with the propeller in an angular position, less area is required to make a take-off. The adjustment means for the engine and propeller 17 preferably comprises an arm 18 suitably fixed to the base 12 and provided on its outer end with a worm gear segment 18' with which meshes a worm 19, the latter being fixed to a shaft 20 mounted in suitable bearings 21, 21, and carrying at its inner end a wheel 22' in operative relation to the aviator's seat 7. By means of the worm 19 and worm gear segment 18', the aviator is able to position the propeller at any desired angle and adjust it at will to any other angle in making a landing dependent on the initial speed of the plane, the area available at or around the landing space and other conditions that may be present.

The propeller 17 is constructed to provide series of blades in diametrical relation so arranged that certain of the blades of one series traverse paths different from the paths traversed by certain of the blades of the other series. The blades of one series are indicated at 17a, 17b, 17c, whereas the blades of the other series are indicated at 17a', 17b', 17c'. The blades 17b, 17b', are in line with each other and connected by a hub 17x. The blades 17a, 17c, are disposed upon opposite sides of and spaced parallelly to the blade 17b, being connected to the latter by connectors 22. I preferably provide two spaced connectors 22 between the blade 17b and each lateral blade 17a and 17c disposed at right angles to the blades, and each connector for the blade 17a being alined with one of the connectors for the other blade 17c. The inner connectors 22 are preferably arranged inwardly of an imaginary point on the blades 17a, 17b, 17c. midway between their opposite ends, whereas the outer connectors 22 are arranged on the opposite side of said point remote therefrom so as to position them relatively near the outer ends of the blades 17a, 17b, 17c, and thus brace these ends against vibration to insure smooth operation of the propeller. The opposite ends of the connectors are provided with plates 22a which are countersunk into the blades to insure smooth outer surfaces thereon, (see Fig. 8), the plates for the inner ends of the connectors being secured to opposite sides of the blade 17b by suitable rivets; whereas the plates on the outer ends of the connectors and plates 22b on the remote sides of the blades 17a, 17c, are similarly connected upon opposite sides thereof. The series of blades 17a', 17b', 17c' are constructed and connected one to the other similarly to the blades 17a, 17b, 17c, so that the above description need not be repeated.

As clearly shown in Fig. 6, the connectors 22 for the blades 17a, 17c are disposed at an angle of approximately 15° to the plane in which the blades 17b, 17b', revolve, so that these blades 17a, 17c traverse paths parallel to but upon opposite sides of said plane, whereas the connectors 22 for the blades 17a', 17c', are disposed at an angle for approximately 55° to said plane so that the blades 17a', 17c' traverse paths parallel to but upon opposite sides of said plane outwardly of the paths traversed by the blades 17a, 17c. It will accordingly be understood that while the blades 17b, 17b', revolve in the same path, each of the lateral blades revolve in a different path and accordingly do not engage with or pass through air disturbed by one of the other blades. In all propellers of which I have knowledge the blades are disposed in the same plane so that each moves through air which is disturbed and distorted by the other blade and hence the efficiency or thrust effect is reduced or causes slip. In my construction of propeller I provide four lateral blades disposed in different planes, so that each effects a thrust on the airplane independently of the other lateral blades. The lateral blades supplement the thrust effect of the blades 17b, 17b', so that the speed of the airplane for any given power out-put is greatly increased. By preference, all of the blades have the same pitch or angular relation to the path in which they respectively traverse.

It will be noted that in my construction, by providing a plurality of blades in side by side relation, the propeller approximates more closely a screw for which reason greater thrust efficiently results.

The arrow in Fig. 4 indicates the direction of rotation, the leading edges of the blades 17a, 17b, 17c being indicated at a and the leading edges of the blades 17a', 17b', 17c', being indicated at a'. In my construction the lateral blades are carried by the adjacent main blade, the connecting and supporting devices therefor being so arranged that vibrations of the blades at their outer ends are substantially eliminated and hence undue strains on the engine shaft and its bearings are avoided.

By making the propeller adjustable to different angles with respect to the direction of flight, the speed of the airplane may be readily changed and this has the further advantage of facilitating maneuvering, for example, when the aviator is endeavoring to locate a landing area and making inspection of an area for other purposes. When the propeller is adjusted to an angular position, any tendency of the fuselage to assume an inclined position may be counteracted or compensated for by operation of the elevators 5 so as to maintain the fuselage in a substantially horizontal position. The blades on one side of the propeller shaft may be balanced in any suitable way with respect to the blades on the other side thereof to avoid abnormal torque reaction.

From the foregoing description, it will be noted that my construction of propeller provides for increased efficiency for any predetermined engine capacity as compared to a propeller of the standard two-blade type. Because of this fact the length of the blades measured from the axis of the propeller shaft may be materially shortened while maintaining a propeller thrust equal to standard two-blade propellers. By using blades of relatively short length, the front end of the fuselage does not have to be supported on long struts or landing gear and where two or more engines are provided, they may be spaced in closer relation.

To those skilled in the art to which my invention relates many changes in construction and widely differing embodiments and applications of the invention will suggest themselves without departing from the spirit and scope of the invention. My disclosures and the description herein are purely illustrative and are not intended to be in any sense limiting.

What I claim is:

1. A propeller comprising a hub adapted to be connected to a shaft and diametrically disposed sets of blades revoluble in substantially the same plane, each set consisting of a main blade connected and extending radially from said hub and arranged to traverse a path common to the path traversed by the main blade of the other set, and a lateral blade and connectors spaced longitudinally of said main and lateral blades for bodily supporting the latter blade on said main blade in spaced parallel relation thereto, the connectors between the blades of one set and the connectors between the blades of the other set being disposed in different angular relations to the axis of said hub, whereby the lateral blades traverse different paths relative to each other and said main blades.

2. A propeller comprising a hub adapted to be connected to a shaft and diametrically disposed series of blades revoluble in substantially the same plane, each series consisting of a main blade connected to and extending radially from said hub and arranged to traverse the path traversed by the main blade of the other series, and lateral blades disposed upon opposite sides of said main blade and connectors between said main blade and said lateral blades for bodily supporting the latter blades on said main blade in spaced parallel relation thereto, the connectors between the blades of one series and the connectors between the blades of the other series being disposed in different angular relation relative to the axis of said hub, whereby each lateral blade traverses a path different from each of the remaining lateral blades.

3. A propeller comprising a hub adapted to be drivingly connected to a shaft and diametrically disposed series of blades revoluble in substantially the same plane, each series consisting of a main blade carried by said hub and arranged to traverse the path traversed by the main blade of the other series, lateral blades disposed upon opposite sides of said main blade and means for bodily supporting the lateral blades on the adjacent main blades in spaced parallel relation thereto, said supporting means for the lateral blades of one series being arranged to support them in one plane cutting the axis of said hub and the lateral blades of the other series in another plane cutting said axis, said planes having different angularity with respect to the hub axis.

EDWARD A. VANETTA.